United States Patent
Weldemariam et al.

(10) Patent No.: US 10,696,299 B2
(45) Date of Patent: Jun. 30, 2020

(54) MANAGING VEHICLE TO VEHICLE COMMUNICATION TO FACILITATE OPERATIONAL SAFETY VIA RISK ASSESSMENT

(71) Applicant: International Business Machines Corporation, Armonk, NY (US)

(72) Inventors: Komminist Weldemariam, Nairobi (KE); Clifford A. Pickover, Yorktown Heights, NY (US); Aisha Walcott, Nairobi (KE); Reginald Eugene Bryant, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 16/026,282

(22) Filed: Jul. 3, 2018

(65) Prior Publication Data
US 2020/0010080 A1    Jan. 9, 2020

(51) Int. Cl.
*B60W 30/095* (2012.01)
*B60W 30/18* (2012.01)
(Continued)

(52) U.S. Cl.
CPC .. *B60W 30/0956* (2013.01); *B60W 30/18163* (2013.01); *G05D 1/0088* (2013.01);
(Continued)

(58) Field of Classification Search
CPC ....... B60W 30/0956; B60W 30/18163; B60W 2420/52; B60W 2420/403;
(Continued)

(56) References Cited

U.S. PATENT DOCUMENTS 7,499,675 B2    3/2009   Tsuzuki et al.
8,307,037 B2   11/2012   Bain et al.
(Continued)

FOREIGN PATENT DOCUMENTS

EP    2902290 A1    5/2015

OTHER PUBLICATIONS

Business Insider, "10 Million Self-Driving Cars Will be on the Road by 2020," http://www.businessinsider.com/report-10-million-self-driving-cars-will-be-on-the-road-by-2020-2015-5-6, Jun. 15, 2016, 2 pages.

(Continued)

*Primary Examiner* — Michael J Zanelli
(74) *Attorney, Agent, or Firm* — Eyal Gilboa; Ryan, Mason & Lewis, LLP

(57) ABSTRACT

In a given computing node comprising at least one processor operatively coupled to a memory and implemented in a given vehicle, the method comprises obtaining at the given computing node data from at least one of: (i) one or more sensors on the given vehicle; (ii) one or more computing nodes associated with one or more other vehicles via at least one vehicle-to-vehicle communication protocol; and (iii) one or more data sources along the path of the given vehicle. The given computing node utilizes at least a portion of the obtained data to compute a risk assessment for the given vehicle with respect to an operational safety level of a proposed vehicle action. The given computing node initiates or prevents the proposed vehicle action for the given vehicle based on the computed risk assessment.

19 Claims, 11 Drawing Sheets

(51) Int. Cl.
*H04W 4/46* (2018.01)
*G05D 1/00* (2006.01)
*G07C 5/00* (2006.01)
*G06N 20/00* (2019.01)

(52) U.S. Cl.
CPC ............ *G06N 20/00* (2019.01); *G07C 5/008* (2013.01); *H04W 4/46* (2018.02); *B60W 2420/403* (2013.01); *B60W 2420/52* (2013.01); *B60W 2420/54* (2013.01); *B60W 2552/05* (2020.02); *B60W 2552/20* (2020.02); *B60W 2555/20* (2020.02); *B60W 2555/60* (2020.02); *B60W 2556/65* (2020.02); *G05D 2201/0213* (2013.01)

(58) Field of Classification Search
CPC . B60W 2550/408; G06N 20/00; G07C 5/008; G05D 1/0088; H04W 4/46
See application file for complete search history.

(56) References Cited

U.S. PATENT DOCUMENTS

| | | | |
|---|---|---|---|
| 8,655,537 B2 | 2/2014 | Ferguson et al. | |
| 8,954,252 B1 | 2/2015 | Urmson et al. | |
| 9,096,267 B2 | 8/2015 | Mudalige et al. | |
| 9,123,241 B2 | 9/2015 | Grigsby et al. | |
| 9,194,168 B1 | 11/2015 | Lu et al. | |
| 2007/0086275 A1 | 4/2007 | Robinson et al. | |
| 2010/0228419 A1* | 9/2010 | Lee ................... | B60W 30/0953 701/25 |
| 2011/0184605 A1* | 7/2011 | Neff ..................... | G05D 1/0231 701/25 |
| 2015/0309512 A1 | 10/2015 | Cudak et al. | |
| 2016/0132058 A1 | 5/2016 | Lee | |
| 2016/0167648 A1 | 6/2016 | James et al. | |
| 2016/0318511 A1 | 11/2016 | Rangwala | |
| 2017/0320500 A1* | 11/2017 | Yoo ................... | B60W 30/0956 |
| 2018/0129215 A1* | 5/2018 | Hazelton .............. | G05D 1/0257 |
| 2019/0023268 A1* | 1/2019 | Pink ..................... | B60W 30/08 |
| 2019/0054922 A1* | 2/2019 | Yalla ................. | B60W 30/18163 |
| 2019/0135290 A1* | 5/2019 | Marden .............. | G06K 9/00805 |
| 2019/0283756 A1* | 9/2019 | Leonard .............. | G05D 1/0278 |

OTHER PUBLICATIONS

Will Knight, "Car-to-Car Communication," MIT Technology Review, https://www.technologyreview.com/s/534981/car-to-car-communication/, Mar./Apr. 2015, 3 pages.

D.W. Harwood et al., "Passing Sight Distance Criteria," National Cooperative Highway Research Program, NCHRP Report 605, Jan. 2008, 95 pages.

\* cited by examiner

200

300

500

600

MANAGING VEHICLE TO VEHICLE COMMUNICATION TO FACILITATE OPERATIONAL SAFETY VIA RISK ASSESSMENT

BACKGROUND

A self-driving vehicle ("SDV") is a vehicle such as, for example, a car, that is capable of operating without a human driver. An SDV determines conditions in its surrounding environment using technology such as, for example, radar, laser, odometry, global positioning system, and computer vision. One or more control systems in the SDV utilize this environmental information to control the SDV as it autonomously navigates paths and obstacles, while abiding by relevant traffic signals and signs.

SDV technology may be applied within the context of public and/or ride-sharing transportation (e.g., self-driving taxis or other types of ride-sharing vehicles). A public or ride-sharing SDV may potentially provide transportation services for a large number of passengers per day.

However, it is realized that as SDVs become more popular, SDV operating safety with regard to other SDVs and non-SDVs is a critical matter that should be considered.

SUMMARY

Embodiments provide techniques for management of vehicle to vehicle communication to facilitate operational safety via risk assessment.

In one embodiment, a method comprises the following steps. In a given computing node comprising at least one processor operatively coupled to a memory and implemented in a given vehicle, the method comprises obtaining at the given computing node data from at least one of: (i) one or more sensors on the given vehicle; (ii) one or more computing nodes associated with one or more other vehicles via at least one vehicle-to-vehicle communication protocol; and (iii) one or more data sources along the path of the given vehicle. The given computing node utilizes at least a portion of the obtained data to compute a risk assessment for the given vehicle with respect to an operational safety level of a proposed vehicle action. The given computing node initiates or prevents the proposed vehicle action for the given vehicle based on the computed risk assessment.

Advantageously, illustrative embodiments provide effective vehicle to vehicle communication control and automated risk assessment techniques for ensuring operational safety during vehicle operations such as, but not limited to, an SDV executing a lane passing action.

These and other exemplary embodiments of the invention will be described in or become apparent from the following detailed description of exemplary embodiments, which is to be read in connection with the accompanying drawings.

DETAILED DESCRIPTION

Figure 1:
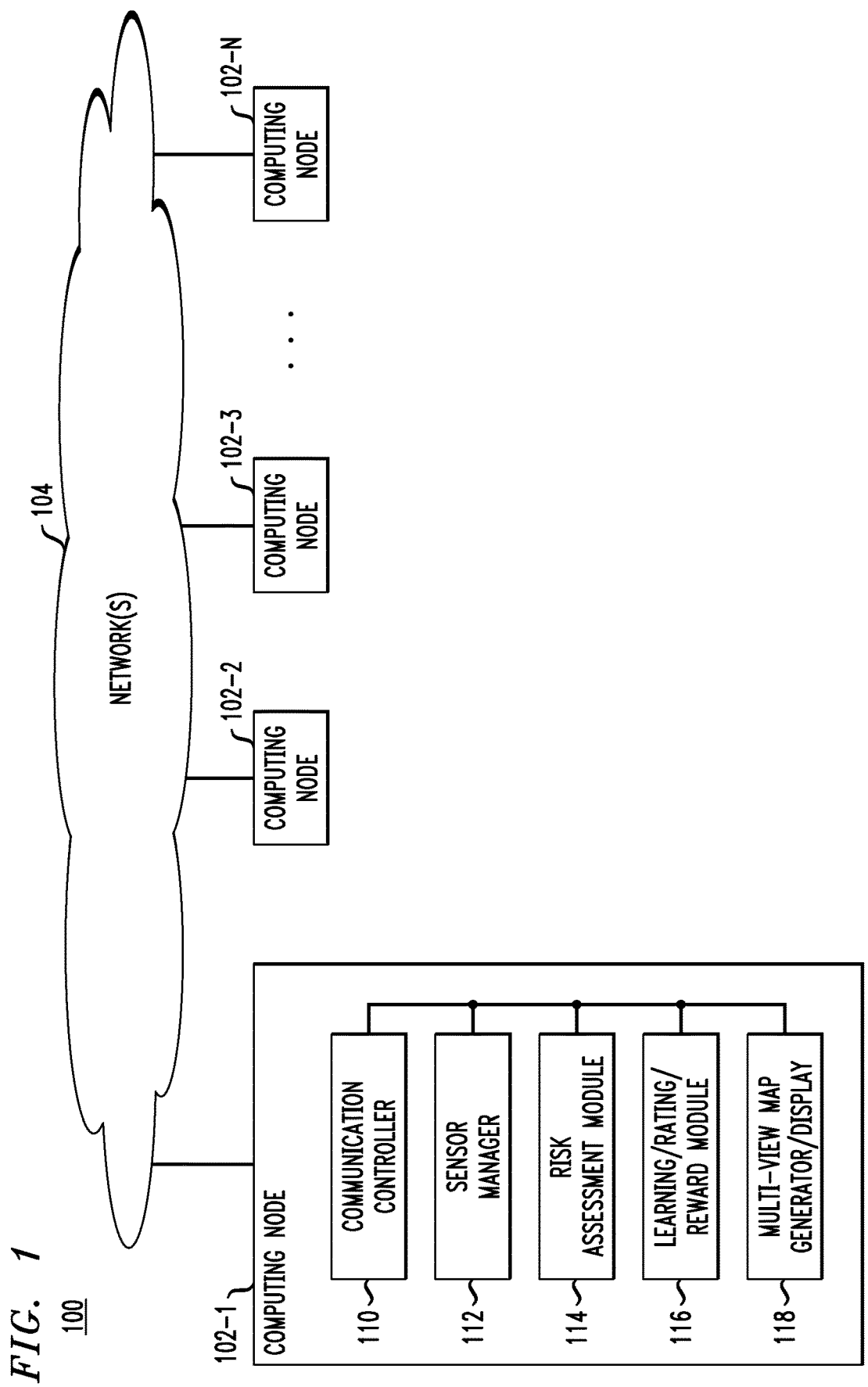
FIG. 1 illustrates a computing platform for managing vehicle to vehicle communication to facilitate operational safety via risk assessment according to one or more embodiments of the invention.

Illustrative embodiments will be described below for managing vehicle to vehicle communication to facilitate operational safety via risk assessment and context analysis. In one example, operational safety focuses on safe lane passing whereby one vehicle overtakes another vehicle on a given roadway. Illustrative embodiments seek to avoid accidents in such operational circumstances. The term "accident" as used herein is intended to be broadly construed to include, but not be limited to, collisions, e.g., between two or more vehicles and/or between one or more vehicles and one or more non-vehicle objects. While illustrative techniques described herein are particularly well-suited for tracking self-driving vehicles (SDVs), it is to be understood that embodiments are not intended to be limited to such vehicles and are more generally applicable to any vehicles including non-SDVs.

More particularly, illustrative embodiments provide methods and systems wherein an SDV is configured with sensors and vehicle-to-vehicle communications used to aid in facilitating safe lane passing, a mechanism for detecting or interpreting signals of a nearby SDV or non-SDV (e.g., alerting a danger ahead, requesting to overtake, allowing a vehicle to merge, driver signals, etc.), for detecting or interpreting of contextual signals of non-vehicle objects and a mechanism for situational risk assessment such that, based on said interpretation and situational risk, the interpretation of a contextual signal of non-vehicle objects, the SDV takes actions to attempt to ensure operational safety.

Prior to explaining details of illustrative embodiments of the techniques for managing vehicle to vehicle communication to facilitate operational safety via risk assessment and context analysis, a brief explanation of some of the SDV developments and operational circumstances that motivate illustrative embodiments will now be given.

SDVs are no longer a futuristic idea. Companies such as Mercedes, BMW, Uber, and Tesla have already released, or are soon to release, self-driving features that give the car some ability to drive itself. It is also believed that some of these SDVs will soon be available in various forms for various purposes such as, by way of example, in the form of taxis for public and shared use and in the form of trucks for use in transporting goods. For instance, Uber is already experimenting with the use of SDVs as ride sharing vehicles. As such, as SDVs become more prevalent, they may want or need to pass each other when driving in the same direction along a roadway. With traditional cars, sometimes drivers can signal one another about passing. This is difficult with SDVs.

Thus, illustrative embodiments address the issue of adding further intelligence in SDVs to facilitate communication (e.g., expressing a need to pass) between an SDV and a nearby SDV or non-SDV to facilitate safe and risk-free lane passing or overtaking. As SDVs interact more and more, illustrative embodiments also facilitate learning from one another, along with rating or evaluating one another regarding the utility of information shared.

Of course, currently with traditional cars, humans perform a lot of informal assessments about whether they can safely pass another car, based on road signs, slope of road, pavement conditions, visibility, etc. Illustrative embodiments realize that SDVs are able to incorporate some of this "thinking" in their actions, but they can benefit from one another by sharing information. For example, if SDV 1 is in front of SDV 2, then SDV 1 may be able to "see further" than SDV 2, and thus provide information useful for SDV 2 passing. The phrase "see further" may not only relate to seeing what cars, pedestrians, animals, and tractors are ahead, but also SDV 1 may be aware of road conditions such as, but not limited to, slippery road conditions. Moreover, groups of SDVs in the vicinity of SDV 2 will be able to see the "passing conditions" from multiple vantage points, providing more information about the passing scene for SDV 1. Illustrative embodiments provide for reconstruction of the passing scene by aggregating the sensor data collected by these groups of vehicles and creating a multi-view local map of the passing scene, as will be further explained below.

Additionally, understanding communication signals from drivers is critical for responsive and safe decision making in different driving scenarios. Exemplary reasons for driver signals are to alert others of danger ahead, when to overtake, and to allow a vehicle to merge. These signals, however, are communicated by drivers differently based on context and driving culture. However, there are a number of challenges when attempting to interpret and discern what a driver means, particularly in different contexts. A key challenge is knowing the driving culture and what various signals mean in that culture. For example, in many major cities in India as well as well as in Ghana, drivers will honk their horns in different patterns to communicate with other drivers. While in other cities, honking may be rarely used.

The heterogeneous mix of human-driven cars, semi-autonomous cars, and SDVs require the ability for all to communicate, interpret vehicle/driver signals and respond safely.

FIG. 1 illustrates a computing platform 100 for managing vehicle to vehicle communication to facilitate operational safety via risk assessment according to one or more embodiments of the invention. More particularly, as shown, the computing platform 100 comprises a plurality of computing nodes 102-1, 102-2, 102-3, . . . , 102-N operatively coupled by one or more communication networks 104.

As further shown, FIG. 1 illustrates component details of each of the computing nodes. While the component details are representatively depicted for computing node 102-1, in one or more illustrative embodiments, each computing node has such components. Each computing node is configured to include a communication controller 110, a sensor manager 112, a risk assessment module 114, a learning/rating/reward module 116 and a multi-view map generator/display 118. It is to be appreciated that, in illustrative embodiments, each vehicle (SDV and non-SDV) that is configured to have one or more of the functionalities described herein has a computing node architecture with one or more of the components shown in computing node 102-1.

While functions of each controller will be described in greater detail herein, in general: the communication controller 110 manages communication (via one or more communication protocols such as cellular or other wireless communication protocols) between SDVs, non-SDVs, and any other system component with which a vehicle needs/desires to communicate; the sensor manager 112 manages all sensor data that a vehicle receives and/or transmits; the risk assessment module 114 is configured to evaluate operational safety risk (e.g., lane passing risk) based on information received from one or more other system components; the learning/rating/reward module 116 manages one or more learning algorithms and an electronic tally system used to collect votes/ratings for each vehicle with respect to operational safety for use in receiving one or more rewards.

Furthermore, at least a portion of the computing nodes in FIG. 1 may be configured to participate in a consensus protocol as peers (i.e., validating peers or validating nodes) in a blockchain-based system. Note also that a unique identifier (UDI) or token for a vehicle may be used to form a decentralized instrument Internet of Things (IoT) network, wherein items (or things) in the network are "smart devices" that are connected to the blockchain through their corresponding UDI or token. This allows for institutional wide tracking of vehicles. Such an IoT network of instruments is embodied by the computing platform 100 in FIG. 1. That is, the items (in this case, vehicles) are trackable through the network(s) 104 that operatively couple the computing nodes that store the blockchain.

In some embodiments, various simple rules may be supplied to SDVs via their respective communication controller 110 (e.g., "avoid passing other vehicles, including motorcycles and bicycles, on two-lane roads because it is dangerous"), but additional advanced information, as disclosed herein, may be supplied as well to SDVs. There are also situations where passing is required/desired, for example, navigating around a broken-down vehicle, accidents, or passing a slower mode of transport such as a pushcart, a tuc-tuc or groups of livestock/animals.

It is realized in accordance with illustrative embodiments that SDVs are typically configured with sensors that may be utilized including but not limited to: cameras (for object or obstacle detection and also for gesture recognition), light sensors, audio sensors, LIDAR, radar, ultrasonic, etc. LIDAR is a method that measures distance to a target by illuminating the target with pulsed laser light and measuring the reflected pulses with a sensor. These sensors in a given SDV are operatively coupled to its sensor manager 112 which receives the sensor data signals and provide the sensor data to one or more other system components as needed by the one or more other system components. For example, sensor manager 112 may provide sensor data received from one or more sensors on the SDV to its communication controller 110 which provides the sensor data (either as raw sensor data, processed sensor data, or some combination thereof) to one or more other vehicles in the network. Additionally or alternatively, sensor manager 112 may provide sensor data received from one or more sensors on the SDV to its risk assessment module 114, learning/rating/reward module 116 and/or multi-view map generator/display 118 to be used in performing their respective functions as will be further explained herein.

It is also realized in accordance with illustrative embodiments that many non-SDVs have sensors that may be utilized including but not limited to: rear (back-up) cameras, vehicle proximity sensors, passenger weight sensors, etc. Additionally, illustrative embodiments include independent sensor systems which are coordinated with SDVs and non-SDVs (e.g., SDV-controlled relay drones used to communicate visual information from vantage points above trucks directly in front of the aforementioned SDV). Such drones (not expressly shown) are in operative communication with the communication controller 110 of each vehicle. Moreover, when available, (real-time) sensor information from the roadway infrastructure (e.g., traffic-light speed cameras, toll-booth Near Field Communication (NFC) beacons) is received by the communication controller 110 and used by the vehicle to make operational decisions such as lane passing decisions.

Illustrative embodiments focus on SDV to SDV communication, however, in some embodiments information provided by humans is utilized. For example, the communication between the requesting vehicle (SDV or non-SDV, say V1) may be based on light signals, honking, hand/gesture signals (for non-SDV), etc. wherein the receiving SDV (V2) may use in-vehicle sensors to interpret these signals via sensor manager 112 that may also incorporate the context analysis from the learning/rating/reward module 116. The interpretation of said signals is based on the analysis of light patterns, audio patterns, gesture recognition techniques, etc. by employing visual analytics, deep learning, etc. The learning portion of learning/rating/reward module 116 is used to provide such analysis. A completely electronic conveyance of information and "handshake" between SDVs 1 and 2 is also contemplated in illustrative embodiments, as well as conveyance of an alerting handshake to those other vehicles in the vicinity and/or entering the "passing scene." Again, such communication handshakes are performed between respective communication controllers 110 of the vehicles.

Furthermore, illustrative embodiments for detecting and interoperating the signals may take into consideration learning from context. The learning portion of learning/rating/reward module 116 is used to provide such context-based learning. Once the signals are learned from each context they are then converted to <communication, action> pairs. The communication is telling the SDV what the V2 or the driver is communicating, and the action informs what the SDV should do and how to do it.

Of course, it is to be emphasized that any use of human gesture analysis (e.g., hand gestures) is used with caution and in conjunction with other information, since it is important that an SDV does not initiate a passing action based on hand gestures alone. In other words, all available other information is considered by SDV 2 when its risk assessment module 114 is computing a risk factor associated with passing. Also, it is to be appreciated that, in many scenarios, the SDVs may be in route to pick up passengers and may not even have a human passenger on board at the time of passing. If desired, the acceptable risk for passing may be set by the risk assessment module 114 to an extremely low risk level, e.g., no passing will take place unless no others cars are detected for 100 yards, no road curves exist, etc.

Figure 2:
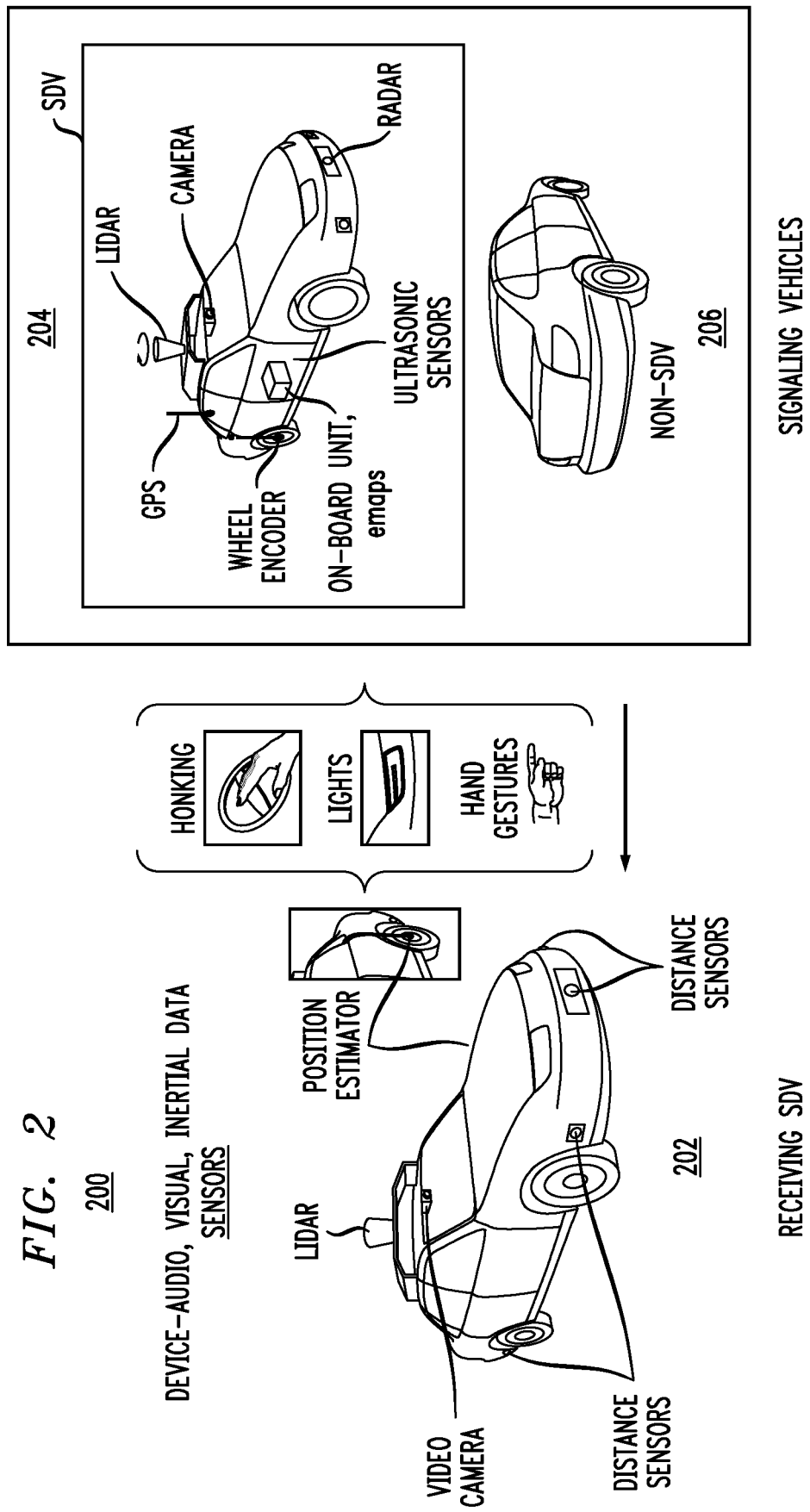
FIG. 2 illustrates examples of vehicle to vehicle communication according to one or more embodiments of the invention.

FIG. 2 illustrates examples of vehicle to vehicle communication 200 according to one or more embodiments of the invention. More particularly, illustrative embodiments provide for communication of sensor information between SDVs (and between non-SDVs, and between SDVs and non-SDVs) to aid in facilitating lane passing. SDVs and/or non-SDVs may also be configured with one or more mechanisms for detecting or interpreting signals and data of a nearby SDV or non-SDV (e.g. alerting a danger ahead, requesting to overtake, allowing a vehicle to merge, driver signals, etc.). Additionally or alternatively, SDV may provide feedback to another SDV or non-SDV based on detected or interpreted signals along with contextual information. As shown in FIG. 2, SDV 202 is a receiving vehicle while SDV 204 and non-SDV 206 are signaling vehicles. The SDVs may be equipped with sensors such as video cameras, LIDAR, position estimators, distance sensors, radar, ultrasonic sensors, global positioning systems, wheel encoders, etc.) which collect information which is shared between the communication controllers 110 of the communicating vehicles. In addition, as shown in FIG. 2, non-SDV 206 sends other signaling such as audible signaling (honking) and/or visual signaling (lights and hand gestures) to the SDV 202 which interprets the signaling as mentioned above. Vehicle-to-vehicle communications can be performed using known communication methods.

The risk assessment module 114 is the mechanism for situational risk assessment and may, in one or more illustrative embodiments, comprise a high dimensional array of information corresponding to such measurables as vehicle types (e.g., length L of the vehicle), vehicle payload, road types (e.g., asphalt, dirt, concrete), weather (e.g., lower visibility ahead), need to pass (e.g., emergency need versus one SDV is in a hurry to make a meeting), daytime versus nighttime driving, road topology (curves, curve radii, number of lanes, hills, etc.), etc. The information stored in the array is collected from the sensor systems of the corresponding vehicles.

Illustrative embodiments further facilitate the requesting SDV 1 to disclose its current context (e.g., electronic calendar and logistics information showing an evidence that SDV 1 needs to deliver a good at location L before 6 PM) to the SDV 2 in a secure way (e.g., through a blockchain-based system).

Similarly, in illustrative embodiments, the SDV (including a forward SDV communicating to a following SDV) may report on when the line-of-sight is restricted or limited by a curve, hill, or weather conditions. The SDV is configured to have awareness through its sensor system as to whether cross-traffic is present, when there is a solid yellow line, or a school bus is loading or unloading children, speed needed to pass, etc. The SDV may also be configured with another computing and/or communication means (e.g. mobile phone, cellular tower, etc.) to receive a temporal signal (e.g., loading or unloading children, temporary road block, etc.).

Based on said interpretation and situational risk, the SDV is configured to take one or more actions. For example, in illustrative embodiments, the risk assessment module 114 provides its operational safety recommendation to the operational computer system of the SDV that controls driving functionalities. For example, with respect to a given SDV and based on the collected sensor information (from its own sensors, sensors of other vehicles, information from other sources such as, but not limited to, roadway information systems), the given SDV may be instructed to execute a lane passing operation.

Of course, it may be argued that lane-passing is inherently risky and should not be permitted by an SDV. While risks do exist, it should be realized that any automated vehicle actions (e.g., even cruise control, parking help, etc.) already have some degree of risk, yet the public is willing to accept some degree of risk. Also, there will be situations when an SDV must take a passing action, e.g., if there is an obstruction on the road (e.g., rock, pothole, animal, etc.), different slower modes of transport, or an accident. Thus, illustrative embodiments help make this process less risky.

Additionally, in at least some embodiments, the system can simply be devoted to preventing passing, even if another driver gestures to pass, because the situation is deemed too dangerous for passing. Also, "no passing" beacons may be present at the sides of some roads, and these will prevent passing, except under exceptional circumstances. The risk assessment module 114 receives these beacons and/or similar prohibitive instructions and prevents the SDV from passing.

Sensors employed in vehicles according to illustrative embodiments come in many varieties. For example, SDV 1 may have an optical signal transmitter (part of an optical transceiver) to provide information to SDV 2 (which has an optical receiver part of an optical transceiver), which is contemplating a passing action. Additionally, as mentioned above, the sensor may be one or more of: a camera (for gesture recognition), light sensors, audio sensors, LIDAR, radar, ultrasonic, etc. Interpreting signals between two SDVs (V1 and V2) or between SDV (V1) and non-SDV (V2) is based on the analysis and detection of light patterns, audio patterns, gesture recognition, etc. by using visual analytics, deep learning, etc.

As mentioned above, it is also contemplated in some embodiments to give a weight to the interpretation of a driver's signals, which may take into consideration understanding driving culture and meanings of various signals in that culture using the wisdom of crowdsourcing.

The situational risk assessment performed by the risk assessment module 114 in conjunction with the sensor manager 112 and contextual analysis from learning/rating/reward module 116 may further employ real-time visual analytics, deep learning etc. by scanning the road ahead or back to help ensure safety (e.g., pedestrian or cyclist crossing at the back of the SDV). It may also consider an aggregation of sensor readings from all SDVs in the passing scene to ensure safety from multiple vantage points.

SDV actions may include a consideration of: where to start passing, when to start passing, acceleration, engine horsepower and performance, etc. These actions may also be generated by considering the historical driving behavior of the vehicle.

Furthermore, in accordance with the rating portion of the learning/rating/reward module 116, illustrative embodiments provide for the SDV to receive ratings, points, or rewards based on how well the SDV helped to reduce risks, for example, by giving appropriate signals for alerting of an accident location ahead. Also, ratings for the SDV may be received based on the nature of human interactions, if any, for example, number of gestural acknowledgments (e.g., hand wave, thank you gesture). Still further, illustrative embodiments provide a mechanism through the reward portion of the learning/rating/rewards module 116 for requesting an SDV to pay to another SDV for facilitating a pass, yielding to another vehicle, wherein the payment (e.g., points, rewards, access to desirable music/movies) may be managed via a blockchain-enabled technology.

Illustrative embodiments also allow groups of SDVs in the vicinity of SDV 2 to be able to see the "passing conditions" from multiple vantage points, by providing more information about the passing scene for SDV 1. The method of reconstructing the passing scene may be aggregated from the sensors' data collected by these groups of vehicles. This allows for creating a dynamically updating multi-view local map of the passing scene. Map generation and display is implemented via the multi-view map generator display 118 in each vehicle.

Given the above described features, FIGS. 3-7 illustratively depict examples of computations and data usable by the risk assessment module 114 to make situational risk assessments and operational decisions (e.g., lane passing) according to one or more embodiments of the invention.

Figure 3:
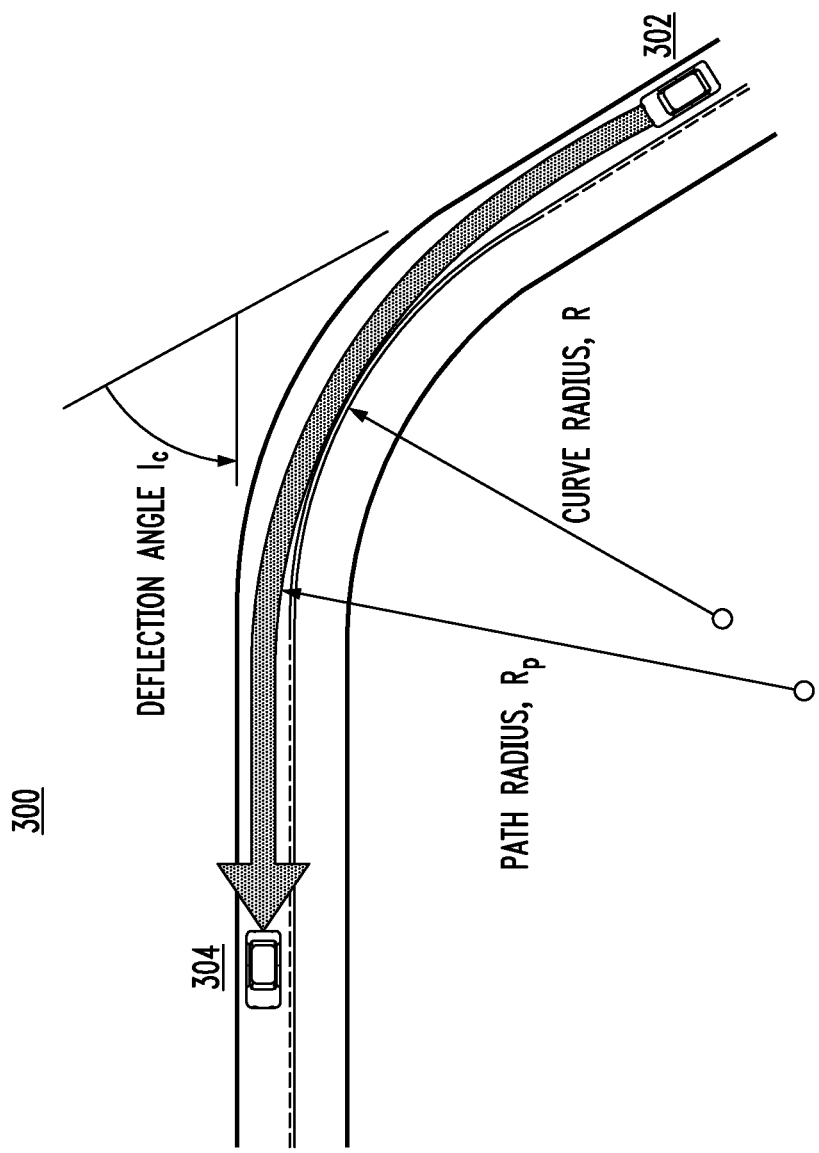
FIG. 3 illustrates examples of geometric parameters associated with roadway curves usable for risk assessment according to one or more embodiments of the invention.

More particularly, FIG. 3 illustrates a situational context 300 with examples of geometric parameters associated with roadway curves usable for risk assessment according to one or more embodiments of the invention. For example, geometric parameters such as deflection angle, curve radius, and path radius as shown are used to assist in a risk assessment by the risk assessment module 114 of following vehicle 302 to determine whether following vehicle 302 can safely execute a lane passing action to pass forward vehicle 304.

Figure 4:
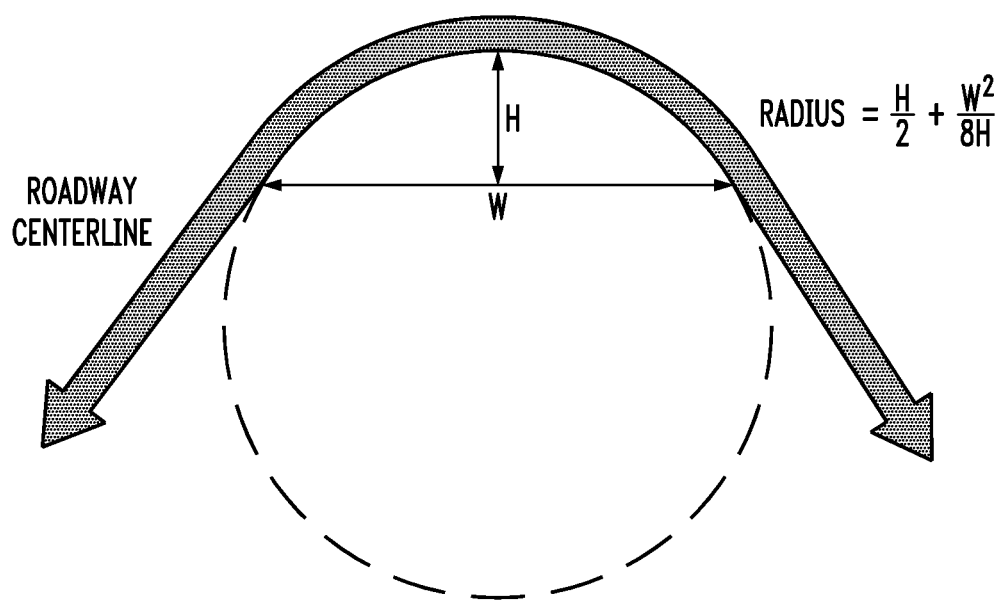
FIG. 4 illustrates an example of roadway curve radius computation for risk assessment according to one or more embodiments of the invention.

By way of another example, FIG. 4 illustrates an example of roadway curve radius computation 400 that can be used by risk assessment module 114 to make the operational safety decision to initiate a lane passing action.

Figure 5:
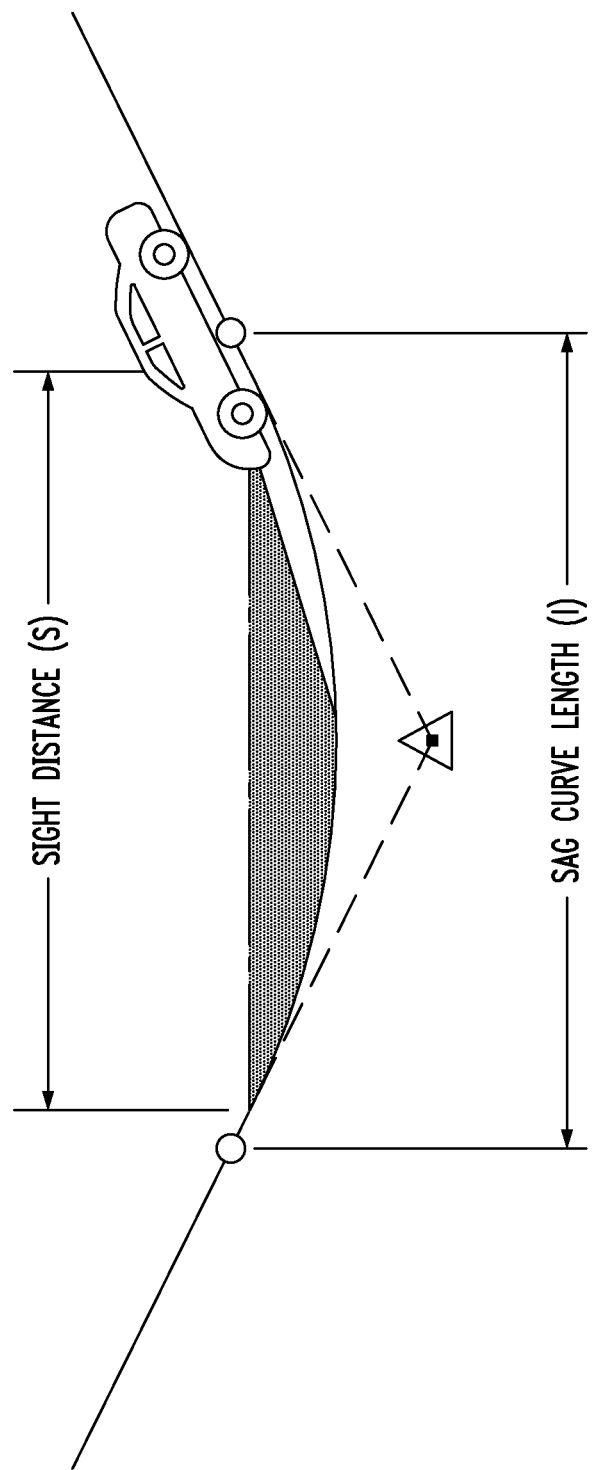
FIG. 5 illustrates an example of roadway sight distance and sag dimensions usable for risk assessment according to one or more embodiments of the invention.

By way of a further example, FIG. 5 illustrates an example of roadway sight distance and sag dimensions 500 usable by risk assessment module 114 to make the operational safety decision to initiate a lane passing action.

Figure 6:
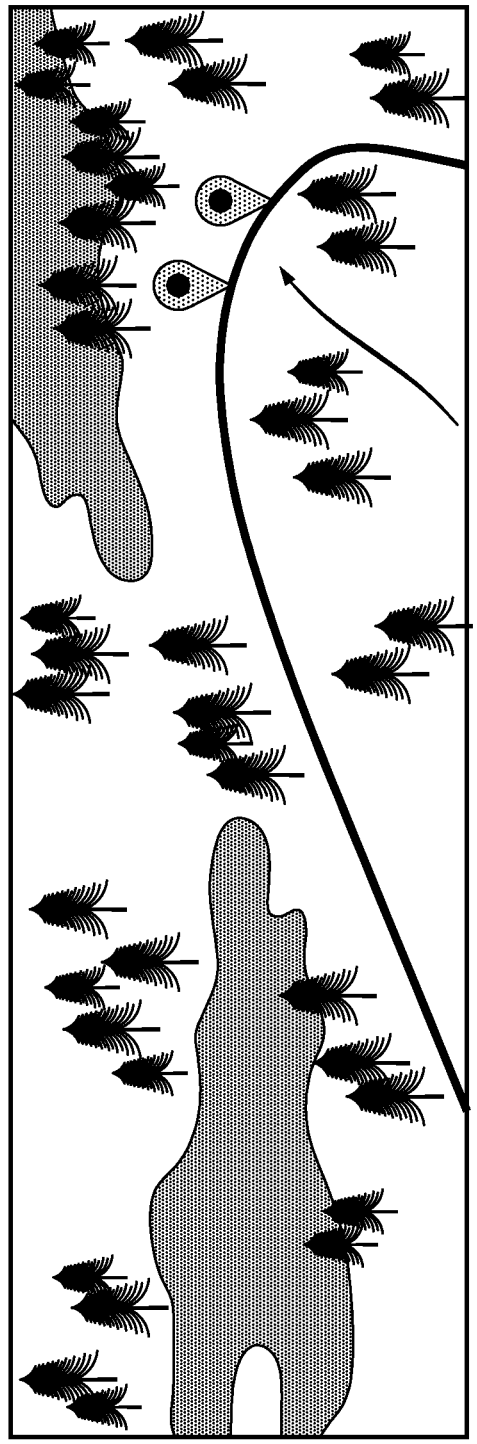
FIG. 6 illustrates vehicle accident and braking incidents usable for risk assessment according to one or more embodiments of the invention.

Still further, FIG. 6 illustrates vehicle accident and braking incidents 600 usable by risk assessment module 114 to make the operational safety decision to initiate a lane passing action. Such incidents information may be obtained by the computing node of a given SDV via roadway infrastructure (e.g., signs, dedicated transmitters, etc.) that broadcasts the accident and braking information. Such accident and braking information may also be collected from other vehicles.

Figure 7:
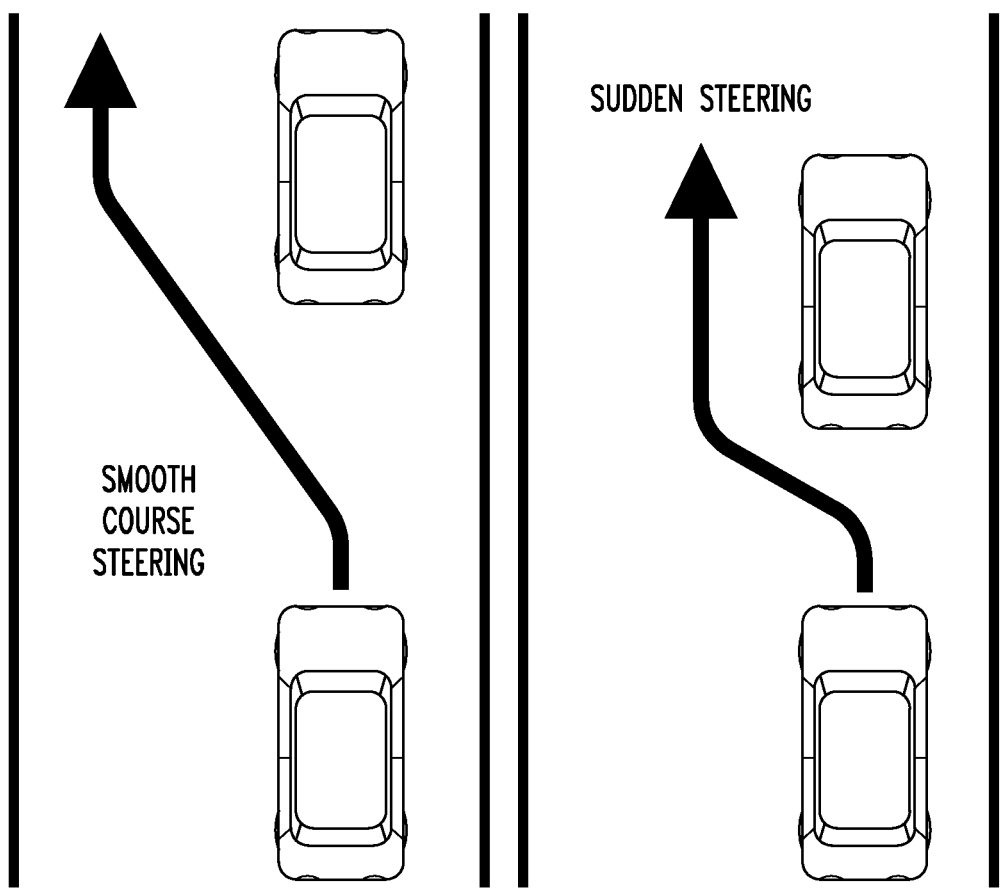
FIG. 7 illustrates steering recommendations usable for risk assessment according to one or more embodiments of the invention.

Lastly, FIG. 7 illustrates steering recommendations 700 usable by risk assessment module 114 to make the operational safety decision to initiate a lane passing action.

It is to be appreciated that data sources and operational safety criteria other than those illustratively depicted in FIGS. 3-7 may be collected, derived, and/or otherwise used by the risk assessment module 114 to make the operational safety decision to initiate a lane passing action or other action.

Figure 8:
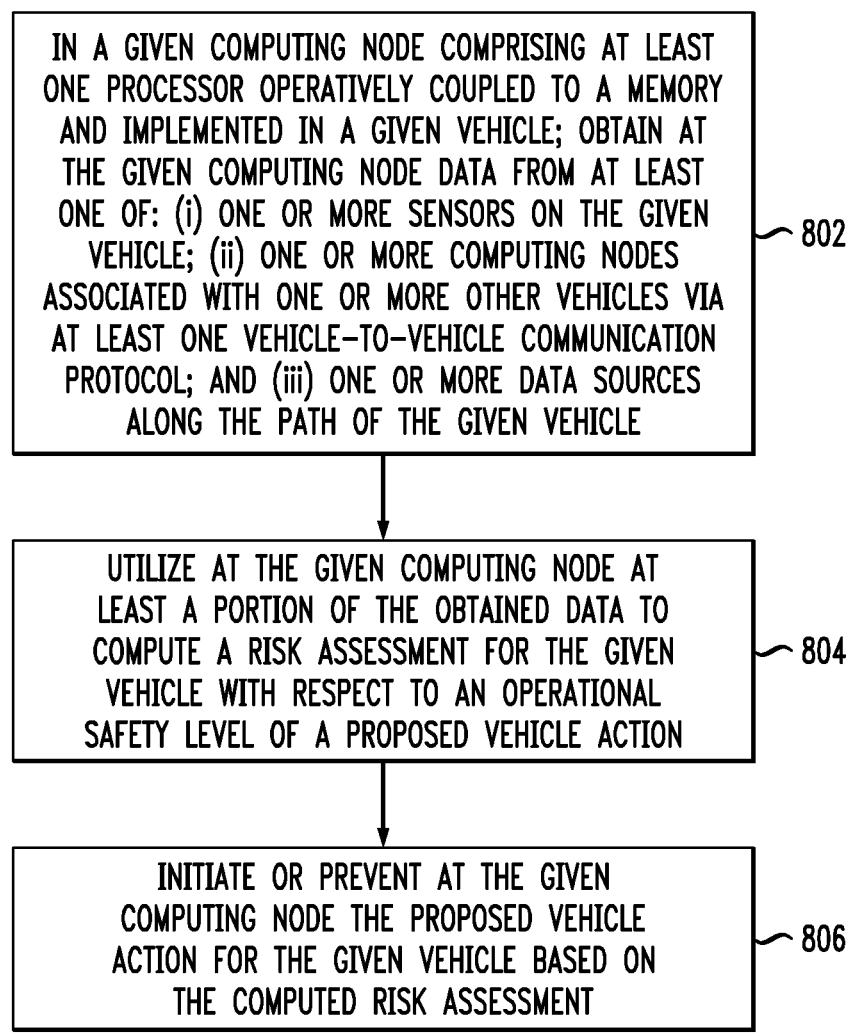
FIG. 8 illustrates a methodology for providing vehicle to vehicle communication to facilitate operational safety via risk assessment according to one or more embodiments of the invention.

FIG. 8 illustrates a methodology for providing vehicle to vehicle communication to facilitate operational safety via risk assessment according to one or more embodiments of the invention. This methodology 800 can be performed by each computing node in the computing platform 100.

In step 802, in a given computing node comprising at least one processor operatively coupled to a memory and implemented in a given vehicle, the method obtains at the given computing node data from at least one of: (i) one or more sensors on the given vehicle; (ii) one or more computing nodes associated with one or more other vehicles via at least one vehicle-to-vehicle communication protocol; and (iii) one or more data sources along the path of the given vehicle.

In step 804, the method utilizes at the given computing node at least a portion of the obtained data to compute a risk assessment for the given vehicle with respect to an operational safety level of a proposed vehicle action.

In step 806, the method initiates or prevents at the given computing node the proposed vehicle action for the given vehicle based on the computed risk assessment.

Accordingly, as described herein, one or more illustrative embodiments provide a method and system comprising: an SDV with sensors to aid in facilitating lane passing; a mechanism for detecting or interpreting signals of nearby SDV or non-SDV (e.g., alerting a danger ahead, requesting to overtake, allowing a vehicle to merge, driver signals, etc.); a mechanism for vehicle-to-vehicle communications; a mechanism for (vehicle)-to-(vehicle-controlled independent sensor system) communications; a mechanism for situational risk assessment; leveraging sensor streams from nearby vehicles to create a local map; and based on said interpretation and situational risk, the SDV taking one or more actions. The sensor may be any of optical devices to sense and then provide information between SDVs, camera (for gesture recognition), light sensors, audio sensors, LIDAR, radar, ultrasonic, etc.

The method may comprise interpreting signals between two SDVs (V1 and V2) or between SDV (V1) and non-SDV (V2) based on analysis and detection of light patterns, audio patterns, gesture recognition, etc. by using visual analytics, deep learning, etc. The interpretation of driver's signals may be considered along with more objective sensor information as an aid in understanding driving culture and meanings of various signals in that culture using the wisdom crowdsourcing.

The assessment of situational risks and contextual situations may comprise analysis of one or more of road conditions, vehicle types (e.g., length L of the vehicle), vehicle payload (e.g., number of passenger, weight of transported goods), road types (e.g., asphalt, dirt, concrete), weather (e.g., lower visibility ahead), need to pass (e.g., emergency need versus one SDV is in a hurry to make a meeting), daytime versus nighttime driving, and road topology (e.g., curves, curve radii, accident history, hills, valleys, etc.). The situational risk assessment may further employ real-time visual analytics, deep learning etc. by scanning the road ahead or back to help ensure safety (e.g., pedestrian or cyclist crossing at the back of the SDV).

The one or more SDV actions may include, but are not limited to, determination of: where to start passing, when to start passing, acceleration, engine horsepower and performance, etc. Further, "no passing" beacons may be present at the sides of some roads, and these will prevent passing, except under exceptional circumstances.

The system and method may further facilitate the requesting SDV1 to disclose its current context (e.g., electronic calendar and logistics information showing an evidence that SDV1 needs to deliver a good at location L before 6 PM) to the SDV2 in a secure way (e.g., through a blockchain-based system).

The SDV may receive rating, points, or rewards based on how well the SDV helped to reduce risks, gives appropriate signals for alerting accident location ahead, and/or nature/value of human interactions. The system may facilitate a mechanism for requesting an SDV to pay to another SDV for facilitating a pass, yielding to another vehicle, wherein the payment (points, rewards, access to desirable music/movies) can be via a blockchain-enabled technology or via a cryptocurrency technology.

The system and method may allow groups of SDVs in the vicinity of SDV2 to be able to see the "passing conditions" from multiple vantage points by providing more information about the passing scene for SDV1. The method may reconstruct the passing scene by aggregating from the sensor data collected by these groups of vehicles. This allows for creating a dynamically updating multi-view local map of the passing scene.

Figure 9:
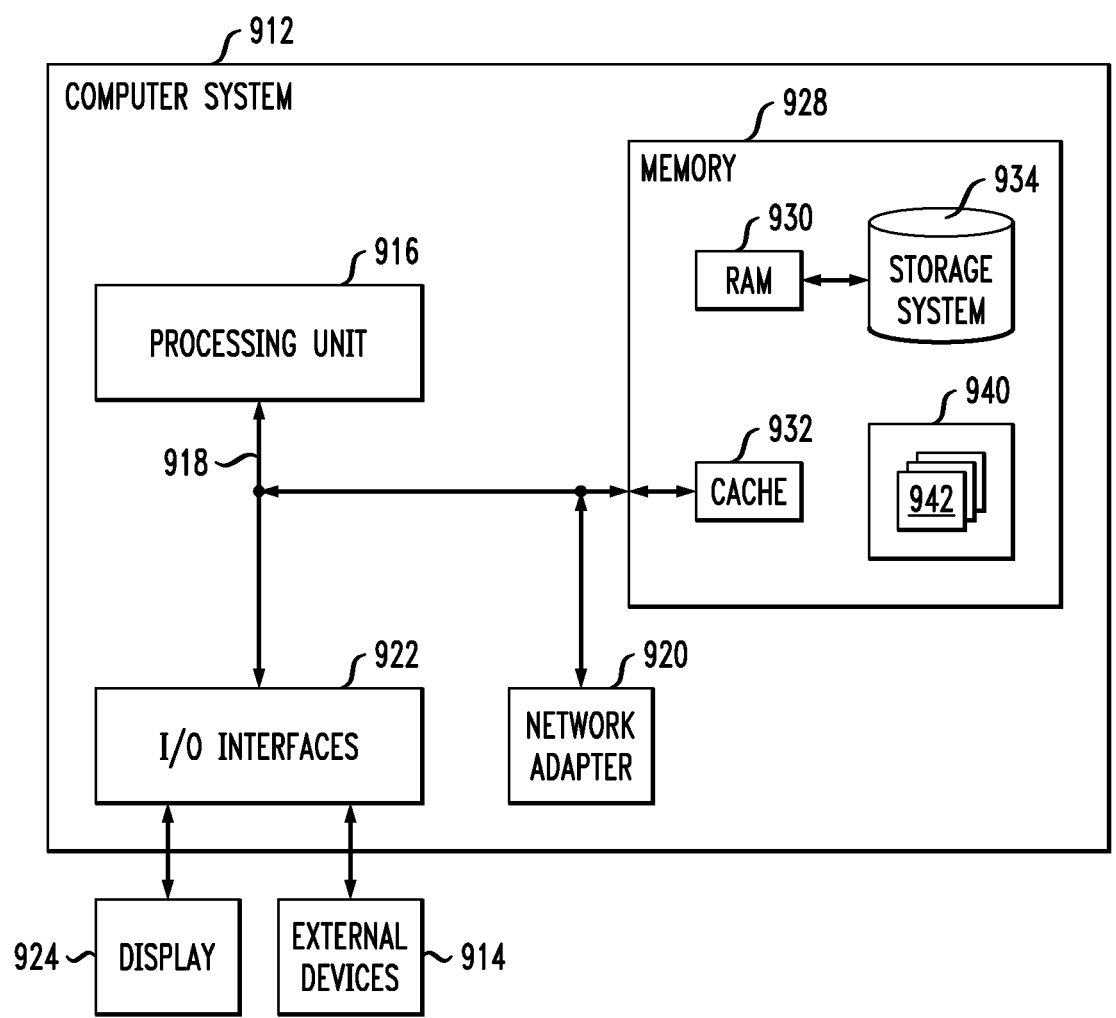
FIG. 9 depicts a computer system in accordance with which one or more components/steps of techniques of the invention may be implemented according to one or more embodiments of the invention.

One or more embodiments can make use of software running on a computer or workstation. With reference to FIG. 9, in a computing node 910 there is a system/server 912, which is operational with numerous other general purpose or special purpose computing system environments or configurations. Examples of well-known computing systems, environments, and/or configurations that may be suitable for use with system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each computing node in the computing platform 100 can implement the architecture shown in computing node 910.

System/server 912 may be described in the general context of computer system executable instructions, such as program modules, being executed by a computer system. Generally, program modules may include routines, programs, objects, components, logic, data structures, and so on that perform particular tasks or implement particular abstract data types. System/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, system/server 912 is shown in the form of a computing device. The components of system/server 912 may include, but are not limited to, one or more processors or processing units 916, system memory 928, and bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System/server 912 typically includes a variety of computer system readable media. Such media may be any available media that is accessible by system/server 912, and it includes both volatile and non-volatile media, removable and non-removable media.

The system memory 928 can include computer system readable media in the form of volatile memory, such as random-access memory (RAM) 930 and/or cache memory 932. System/server 912 may further include other removable/non-removable, volatile/nonvolatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces.

As depicted and described herein, memory 928 may include at least one program product having a set (e.g., at least one) of program modules that are configured to carry out the functions of embodiments of the invention. A program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

System/server 912 may also communicate with one or more external devices 914 such as a keyboard, a pointing device, an external data storage device (e.g., a USB drive), display 924, one or more devices that enable a user to interact with system/server 912, and/or any devices (e.g., network card, modem, etc.) that enable system/server 912 to communicate with one or more other computing devices. Such communication can occur via I/O interfaces 922. Still yet, system/server 912 can communicate with one or more networks such as a LAN, a general WAN, and/or a public network (e.g., the Internet) via network adapter 920. As depicted, network adapter 920 communicates with the other components of system/server 912 via bus 918. It should be understood that although not shown, other hardware and/or software components could be used in conjunction with system/server 912. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
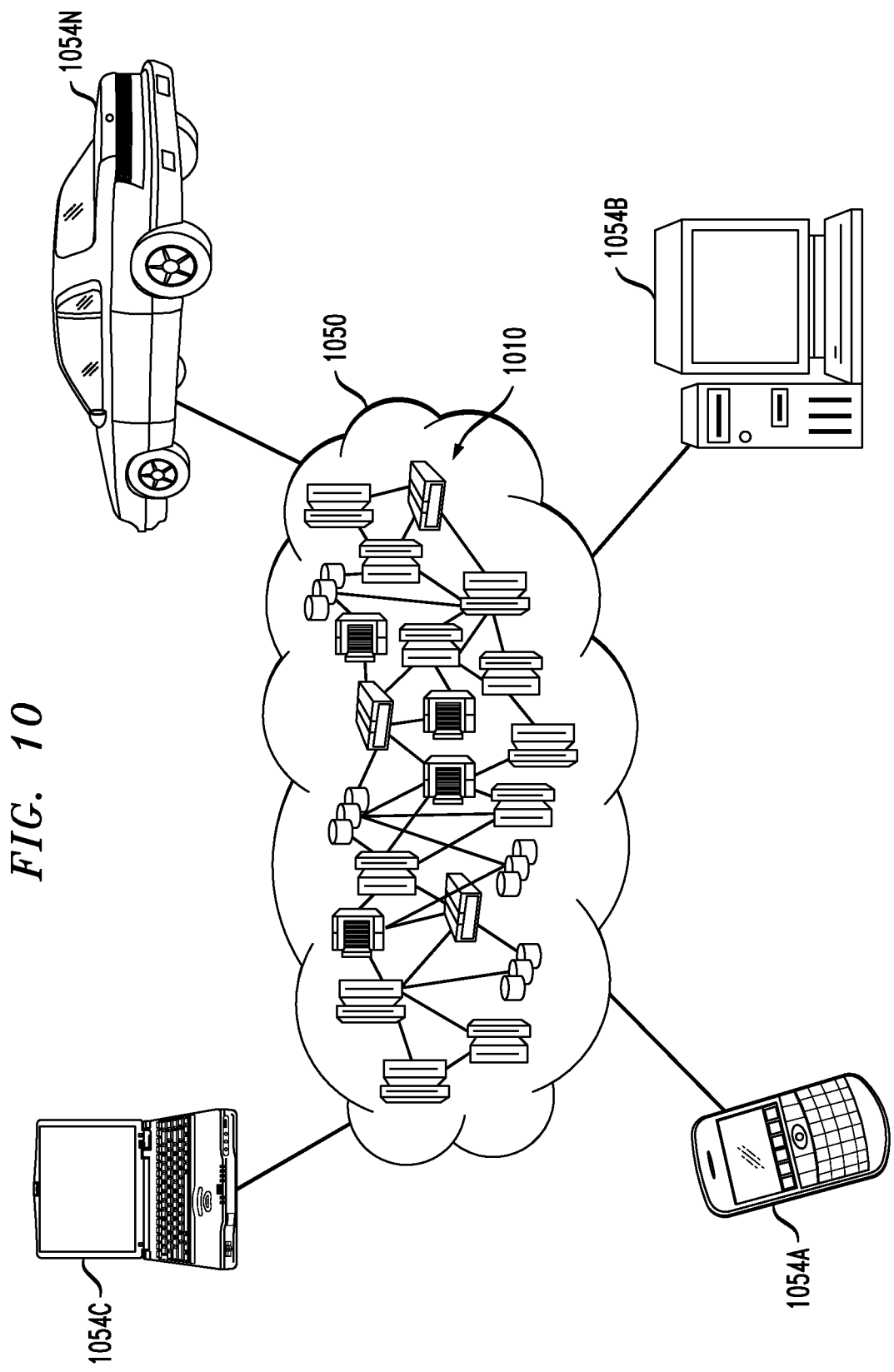
FIG. 10 depicts a cloud computing environment according to one or more embodiments of the invention.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
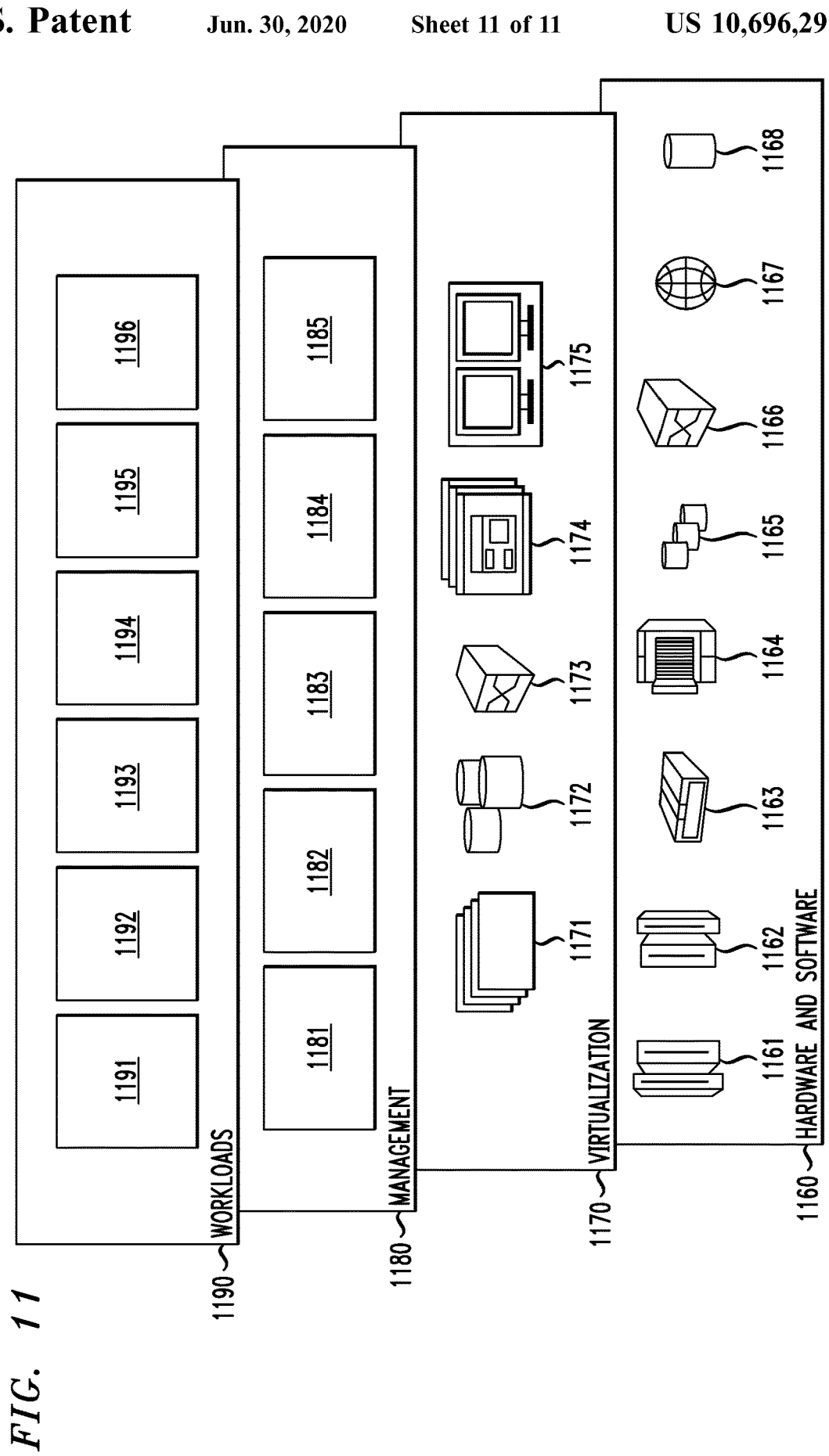
FIG. 11 depicts abstraction model layers according to one or more embodiments of the invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture-based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: communication control processing 1191; sensor management processing 1192; risk assessment processing 1193; 1194; learning/rating/reward processing 1195; and multi-view map generation/display processing 1196, which may perform various functions described above.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
    in a given computing node comprising at least one processor operatively coupled to a memory and implemented in a given vehicle;
    obtaining at the given computing node data from at least one of: (i) one or more sensors on the given vehicle; (ii) one or more computing nodes associated with one or more other vehicles via at least one vehicle-to-vehicle communication protocol; and (iii) one or more data sources along the path of the given vehicle;
    utilizing at the given computing node at least a portion of the obtained data to compute a risk assessment for the given vehicle with respect to an operational safety level of a proposed vehicle action;
    initiating or preventing at the given computing node the proposed vehicle action for the given vehicle based on the computed risk assessment; and
    receiving, for the given vehicle at the given computing node, one or more of a rating, a reward, and a payment based on operational safety criteria.

2. The method of claim 1, wherein the proposed vehicle action comprises a lane passing action whereby the given vehicle intends to pass at least one object.

3. The method of claim 2, wherein the at least one object is another vehicle moving in the same path as the given vehicle.

4. The method of claim 1, further comprising utilizing at least a portion of the obtained data to generate a dynamic map of a portion of the path of the given vehicle.

5. The method of claim 4, wherein the dynamic map is a multi-view map of a local area within which the proposed vehicle action is to occur.

6. The method of claim 5, wherein the dynamic multi-view map is generated by aggregating sensor data in real-time from at least a portion of the one or more other vehicles.

7. The method of claim 1, wherein the one or more sensors comprise one or more optical devices, one or more camera, one or more light sensors, one or more audio sensors, one or more LIDAR devices, one or more radar devices, and one or more ultrasonic devices.

8. The method of claim 1, further comprising the computing node of the given vehicle interpreting signals from the one or more other vehicles based on analysis and detection of one or more of a light pattern, an audio pattern, and gesture recognition.

9. The method of claim 8, wherein the interpretation of signals is performed with objective sensor information as an aid in understanding driving context, culture and crowd-sourcing.

10. The method of claim 1, wherein the risk assessment considers analysis of one or more of: road conditions, vehicle types, vehicle payload, road types, weather, need to perform proposed vehicle action, time of day, and road topology.

11. The method of claim 1, wherein the risk assessment employs real-time visual analytics and deep learning algorithms by scanning the road ahead or back of the given vehicle to attempt to ensure operational safety.

12. The method of claim 1, wherein the given vehicle further obtains a no passing signal from a beacon.

13. The method of claim 1, wherein the risk assessment is computed using a current and historical context of the given vehicle.

14. The method of claim 1, wherein at least a portion of the data exchanged between the given vehicle and the one or more other vehicles is managed via a blockchain-based system.

15. The method of claim 1, wherein the given vehicle is a self-driving vehicle.

16. The method of claim 1, wherein the one or more other vehicles comprises one or more of a self-driving vehicle and a non-self-driving vehicle.

17. A method, comprising:
in a given computing node comprising at least one processor operatively coupled to a memory and implemented in a given vehicle;
obtaining at the given computing node data from at least one of: (i) one or more sensors on the given vehicle; (ii) one or more computing nodes associated with one or more other vehicles via at least one vehicle-to-vehicle communication protocol; and (iii) one or more data sources along the path of the given vehicle;
utilizing at the given computing node at least a portion of the obtained data to compute a risk assessment for the given vehicle with respect to an operational safety level of a proposed vehicle action; and
initiating or preventing at the given computing node the proposed vehicle action for the given vehicle based on the computed risk assessment;
wherein the proposed vehicle action comprises a determination of where to start passing, when to start passing, acceleration, and engine horsepower and performance.

18. An apparatus, comprising:
at least one processor operatively coupled to a memory and forming a given computing node implemented in a given vehicle, wherein the given computing node is configured to:
obtain at the given computing node data from at least one of: (i) one or more sensors on the given vehicle; (ii) one or more computing nodes associated with one or more other vehicles via at least one vehicle-to-vehicle communication protocol; and (iii) one or more data sources along the path of the given vehicle;
utilize at the given computing node at least a portion of the obtained data to compute a risk assessment for the given vehicle with respect to an operational safety level of a proposed vehicle action;
initiate or prevent at the given computing node the proposed vehicle action for the given vehicle based on the computed risk assessment; and
receive, for the given vehicle at the given computing node, one or more of a rating, a reward, and a payment based on operational safety criteria.

19. A computer program product comprising a non-transitory processor-readable storage medium having encoded therein executable code of one or more software programs, wherein the one or more software programs when executed by the one or more processors of a given computing node associated with a given vehicle implement steps of:
obtaining at the given computing node data from at least one of: (i) one or more sensors on the given vehicle; (ii) one or more computing nodes associated with one or more other vehicles via at least one vehicle-to-vehicle communication protocol; and (iii) one or more data sources along the path of the given vehicle;
utilizing at the given computing node at least a portion of the obtained data to compute a risk assessment for the given vehicle with respect to an operational safety level of a proposed vehicle action;
initiating or preventing at the given computing node the proposed vehicle action for the given vehicle based on the computed risk assessment; and
receiving, for the given vehicle at the given computing node, one or more of a rating, a reward, and a payment based on operational safety criteria.

* * * * *